(12) United States Patent
Satoh et al.

(10) Patent No.: US 7,767,965 B2
(45) Date of Patent: Aug. 3, 2010

(54) NEUTRON DETECTOR AND NEUTRON IMAGING SENSOR

(75) Inventors: Kazuo Satoh, Izumi (JP); Tsutomu Yotsuya, Sakai (JP); Takekazu Ishida, Izumi (JP); Shigehito Miki, Sakai (JP)

(73) Assignees: Japan Science and Technology Agency, Saitama (JP); Osaka Prefecture University Public Corporation, Osaka (JP)

( * ) Notice: Subject to any disclaimer, the term of this patent is extended or adjusted under 35 U.S.C. 154(b) by 264 days.

(21) Appl. No.: 11/885,893

(22) PCT Filed: Mar. 3, 2006

(86) PCT No.: PCT/JP2006/304137

§ 371 (c)(1),
(2), (4) Date: May 12, 2008

(87) PCT Pub. No.: WO2006/095659

PCT Pub. Date: Sep. 14, 2006

(65) Prior Publication Data

US 2009/0072141 A1   Mar. 19, 2009

(30) Foreign Application Priority Data

Mar. 7, 2005   (JP) .............................. 2005-062794

(51) Int. Cl.
*H01L 27/18* (2006.01)
(52) U.S. Cl. ................................. 250/336.2
(58) Field of Classification Search ................. 250/336.2
See application file for complete search history.

(56) References Cited

U.S. PATENT DOCUMENTS 6,849,850 B2 *   2/2005   Katagiri et al. .......... 250/336.2

(Continued)

FOREIGN PATENT DOCUMENTS

JP   2002-071821 A   3/2002

(Continued)

OTHER PUBLICATIONS

Tanaka et al., "Yokyoku Setsugo Wafer o Mochiita Transition Edge X-ray Sensor", The Transactions of the Institute of Electrical Engineers of Japan, vol. 122-E, No. 11, pp. 517-522 (2002).

(Continued)

*Primary Examiner*—David P Porta
*Assistant Examiner*—Mindy Vu
(74) *Attorney, Agent, or Firm*—The Webb Law Firm

(57) ABSTRACT

A neutron detector includes a plurality of neutron detecting element sections, each of the neutron detecting element sections having; a superconducting element including a substrate having at least one of surfaces thereof formed of a dielectric material, a strip line of the superconducting material formed on the surface and electrodes formed at opposed ends of the strip line, resistance determining sections for determining generation of heat resulting from a nuclear reaction between a superconducting element in the strip line and neutrons, through detection of change in a resistance value of said strip line, heat dissipation setting sections provided on a back side portion of the substrate opposite to the surface having the strip line formed thereon, the heat dissipation setting sections setting dissipation characteristics of the heat resulting from the nuclear reaction, and the heat dissipation characteristics being differentiated from each other between/among the neutron detecting element sections.

11 Claims, 8 Drawing Sheets

U.S. PATENT DOCUMENTS

2004/0011960 A1* 1/2004 Morooka et al. ......... 250/336.1
2004/0016883 A1* 1/2004 Polonsky et al. ......... 250/336.2

FOREIGN PATENT DOCUMENTS

| JP | 2002071816 | 3/2002 |
| --- | --- | --- |
| JP | 2002-357660 A | 12/2002 |
| JP | 2003014861 | 1/2003 |
| JP | 2004-214293 A | 7/2004 |
| JP | 2005286245 A | 10/2005 |

OTHER PUBLICATIONS

Shigehito Miki et al., "Chodendo MgB2 Usumaku o Mochiita Chuseishi Kenshutsuki no Kaihatsu I", Oyo Butsurigaku Kankei Rengo Koenkai Koen Yokoshu, vol. 51, No. 1, p. 278 (2004).

Shigehito Miki et al., "Chodendo MgB2 Usumaku o Mochiita Chuseishi Kenshutsuki no Kaihatsu II", Oyo Butsurigaku Kankei Rengo Koenkai Koen Yokoshu, vol. 65, No. 1, p. 188 (2004).

* cited by examiner

NEUTRON DETECTOR AND NEUTRON IMAGING SENSOR

BACKGROUND OF THE INVENTION

1. Technical Field

The present invention relates to a neutron detector having a plurality of neutron detecting element sections and relates also to a neutron imaging sensor.

2. Background Art

Conventionally, there has been developed an apparatus using a material having a high superconducting transition temperature. As such material having a high superconducting transition temperature, there is known $MgB_2$ having a superconducting transition temperature of 39K. And, there is known an apparatus using a neutron detecting plate formed of e.g. $MgB_2$ obtained by enrichment of $^{10}B$ having a large energy gap containing $^{10}B$ as a constituent thereof, so that phonons generated by α rays generated in association with impingement of neutrons on this detecting plate are detected (see Patent Document 1 for example)

Further, there has been also proposed a neutron imaging sensor capable of two-dimensional detection of neutrons with using a scintillator plate. Such neutron imaging sensor is capable of two-dimensional detection of neutrons as the sensor is provided with the scintillator plate which scintillates upon impingement of neutrons thereto and a wavelength shift fiber arranged two-dimensionally relative to the scintillator plate (see e.g. Patent Document 2).

Patent Document 1: Japanese Patent Application "Kokai" No. 2003-14861

Patent Document 2: Japanese Patent Application "Kokai" No. 2002-71816

SUMMARY OF THE INVENTION

The conventional neutron detector is a general-purpose apparatus designed for simple detection of neutrons. Therefore, the apparatus is not designed to cope with various applications such as an application which requires higher time resolution even at the cost of detection sensitivity, an application which requires higher detection sensitivity at the cost of time resolution, etc.

An exemplary application of the neutron detector relating to the present invention is its use in analysis of structure of a substance by utilizing neutron diffraction. In the case of this application, if a long-time observation is to be conducted with use of a low intensity neutron source, this will require a neutron detector having a higher detection sensitivity, although its time resolution may be low. Conversely, if a short-time observation is to be conducted with use of a high intensity neutron source, this will require a neutron detector having a higher time resolution, although its detection sensitivity may be low.

As described above, the conventional neutron detectors are not suited for some particular or specialized requirement such as high sensitivity, high time resolution for neutron detection, etc. And, it is also unknown what constructions can realize high sensitivity, high time resolution for neutron detection easily. Further, as another problem, although it is sometimes required to effect the neutron detection in a two-dimensional manner, the convention has been unable to effect such two-dimensional neutron detection with good sensitivity and time resolution.

The present invention has been made in view of the above-described problem and its object is to provide a neutron detector and a neutron imaging sensor which allow setting of sensitivity and time resolution through simple modification in the apparatus construction.

For accomplishing the above-noted object, according to characterizing features of a neutron detector relating to the present invention, the detector comprises:

a plurality of neutron detecting element sections, each said neutron detecting element section having;

a superconducting element including a substrate having at least one of surfaces thereof formed of a dielectric material, a strip line of the superconducting material formed on said surface and electrodes formed at opposed ends of said strip line, resistance determining sections adapted for determining generation of heat resulting from a nuclear reaction between a superconducting element in the strip line and neutrons, through detection of change in a resistance value of said strip line, a heat dissipation setting section provided on a back side portion of said substrate opposite to said surface having said strip line formed thereon, said heat dissipation setting section adapted for setting dissipation characteristics of said heat resulting from the nuclear reaction, and the heat dissipation characteristics being differentiated from each other between/among the neutron detecting element sections.

According to the above-described characterizing construction, the heat dissipation setting means sets the dissipation of the heat resulting from the nuclear reaction between the superconducting element in the strip line and neutrons. Then, with such setting of heat dissipation by the heat dissipation setting means, for a same amount of heat resulting from the nuclear reaction, the amount and residence time of the heat staying in the vicinity of the strip line are differentiated from each other. And, by enhancing the heat dissipation characteristics, the amount of heat staying in the vicinity of the strip line is reduced, whereas, the residence time thereof is shortened. As a result, the time resolution of the nuclear reaction between the superconducting element in the strip line and the neutron can be improved. Conversely, by degrading the heat dissipation characteristics, the residence time of the heat staying in the vicinity of the strip line is increased, whereas the amount thereof is increased. As a result, the detection sensitivity of the nuclear reaction between the superconducting element in the strip line and the neutron can be enhanced.

Moreover, since the heat dissipation characteristics for the heat resulting from the nuclear reaction are differentiated from each other between/among the neutron detecting element sections, it is possible to obtain a neutron detector having both a superconducting element having superior time resolution due to enhanced heat dissipation characteristics and a superconducting element having superior detection sensitivity due to degraded heat dissipation characteristics.

In the above-described construction, preferably, said plurality of neutron detecting element sections are provided on a same single substrate.

With this construction, by using e.g. a silicon substrate as said substrate, it becomes possible, with a semiconductor manufacturing process, to obtain a neutron detector having a number of neutron detecting element sections in a high density on the same single substrate.

Further, the detector can include three or more of said neutron detecting element sections, with the heat dissipation characteristics being differentiated among them in three or more levels.

With this construction, the neutron detection can be made with three or more different levels of time resolution and detection sensitivity. Therefore, even when the amount and/or intensity of the neutrons to be detected vary, the neutron detection can be effected appropriately with the single apparatus.

Still preferably, variable setting of thickness of the back side portion of said substrate constitutes said heat dissipation setting means.

With the above construction, when the neutron detecting element sections are produced by the semiconductor manufacturing process for instance, the heat dissipation setting means can be formed relatively easily through setting of etching depth for the back side portion of the substrate.

Still preferably, the thicknesses of the back side portions of said substrate are differentiated from each other between/among the neutron detecting element sections.

Further preferably, said resistance determining means is configured to determine the resistance value of each individual one of the plurality of neutron detecting element sections.

Preferably, some of the plurality of neutron detecting element sections are resolution priority type neutron detecting element sections having enhanced time resolution obtained by improving the heat dissipation characteristics by the heat dissipation setting means, relative to those of the other neutron detecting element sections.

Alternatively, some of the plurality of neutron detecting element sections can be sensitivity priority type neutron detecting element sections having enhanced sensitivity by degrading the heat dissipation characteristics by the heat dissipation setting means, relative to those of the other neutron detecting element sections.

With these constructions, it is possible to obtain a neutron detector including both superconducting elements having the superior time resolution and superconducting elements having the superior detection sensitivity. Therefore, even when the amount and/or intensity of the neutrons to be detected vary, the neutrons can be appropriately detected by the single apparatus.

Preferably, said superconducting material contains $MgB_2$, so that $^{10}B$ present in said strip line provides the nuclear reaction with the neutrons.

With this construction, since the superconducting material constituting the strip line contains $MgB_2$ which exhibits a superconducting transition temperature at a high temperature, there is obtained an advantage of not needing to enlarge a cooling unit for cooling the strip line.

Still preferably, said strip line is formed as a meandering strip line.

With this construction, as the strip line is formed as a meandering strip line, narrow strip lines will be formed and laid out like a plane. As a result, it is possible to increase the chance of the nuclear reaction between the superconducting material constituting the strip line and the neutron.

For accomplishing the aforementioned object, according to the characterizing features of a neutron imaging sensor relating also to the present invention, said sensor comprises a plurality of said neutron detecting element sections having the above-described construction arranged in the form of an array.

With this construction, since the neutron detecting element sections are arranged two dimensionally in the form of an array, neutrons can be detected with high detection sensitivity and high time resolution over a large two-dimensional area.

DETAILED DESCRIPTION OF THE INVENTION

A neutron detector relating to the present invention comprises a plurality of neutron detecting element sections 21. Therefore, the construction of one neutron detecting element section 21 will be described first.

Figure 1:
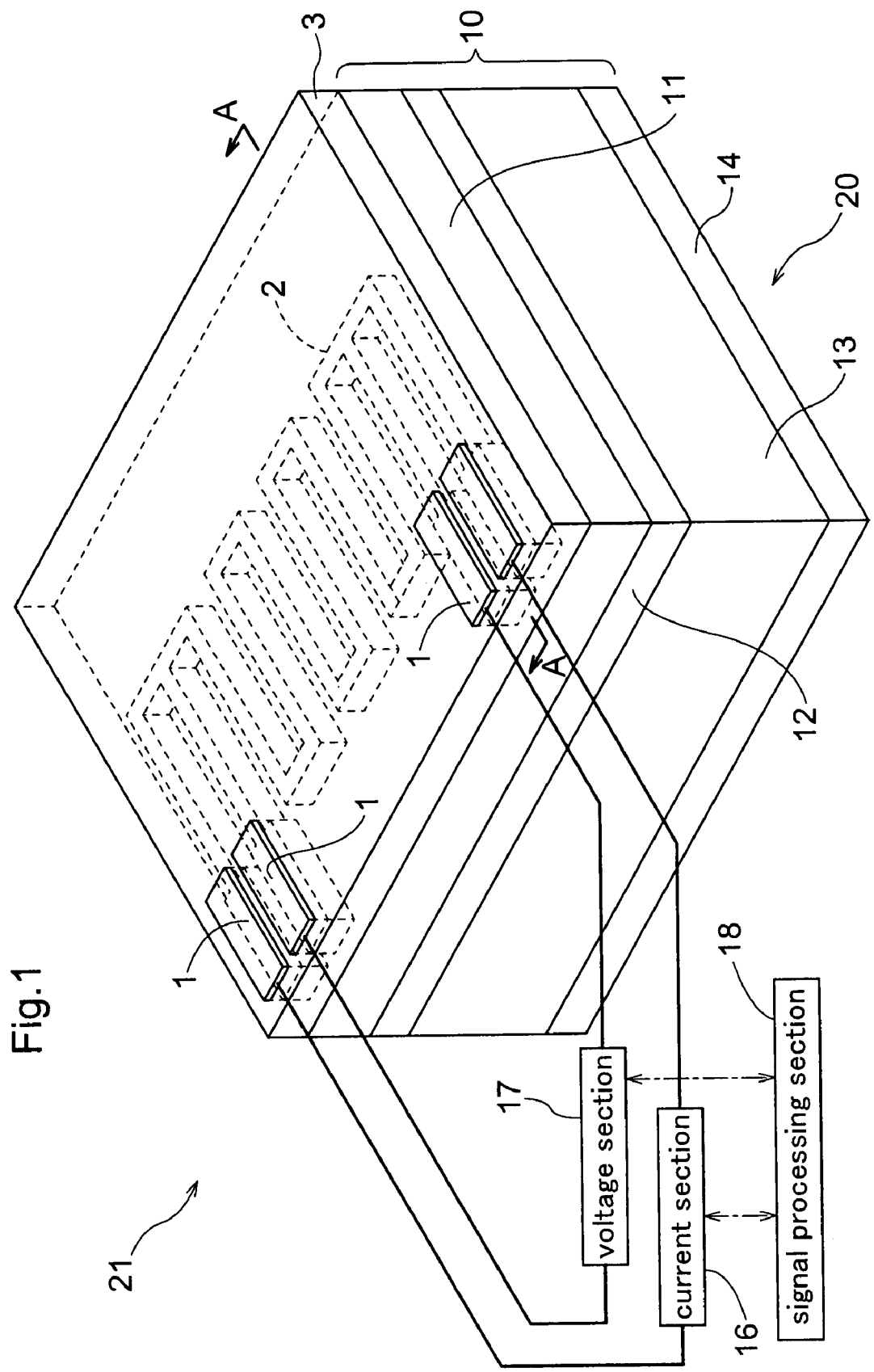
FIG. 1 is a schematic perspective view of a neutron detecting element section.
Figure 2:
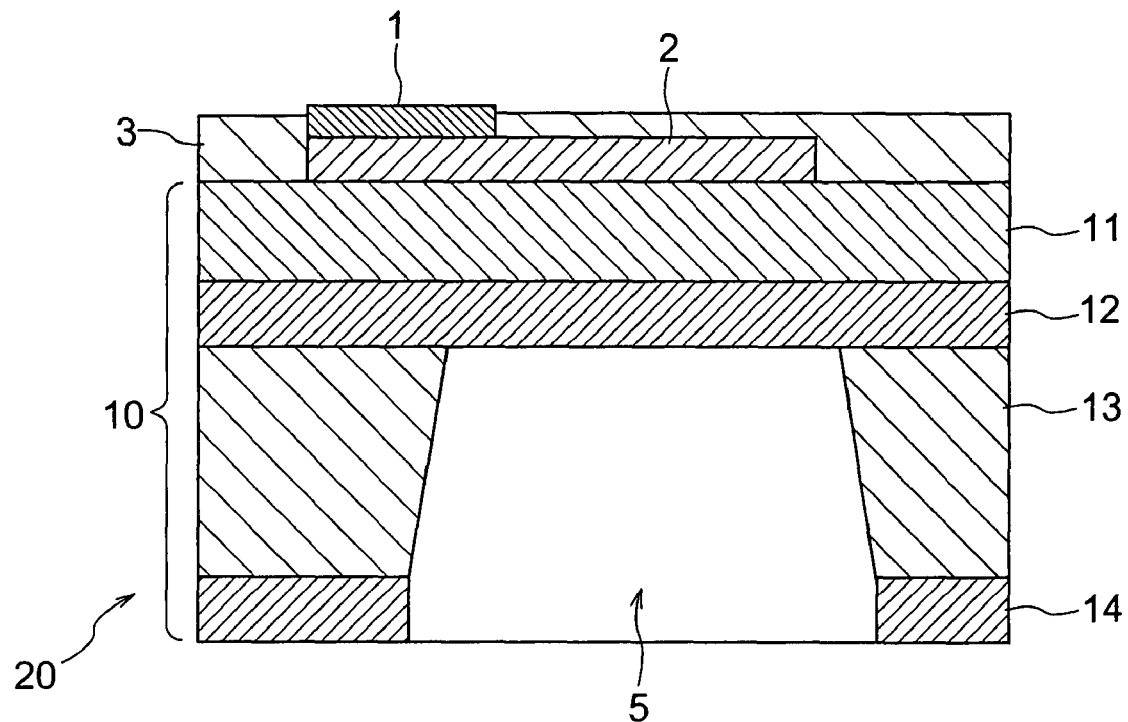
FIG. 2 is a vertical section taken along a line A-A in FIG. 1.

FIG. 1 shows a schematic of the neutron detecting element section 21 having a superconducting element 20. FIG. 2 shows a vertical section taken along line A-A in FIG. 1.

As shown in FIG. 1 and FIG. 2, the superconducting element 20 includes a substrate 10 having at least one surface thereof formed of a dielectric material, a strip line 2 formed on the one surface of a superconducting material containing $MgB_2$, and electrodes 1 formed at opposed ends of the strip line 2. In operation, when there occurs a nuclear reaction between $^{10}B$ present in the strip line 2 and neutrons, due to heat generation resulting from this nuclear reaction, there develops a change in the resistance value of the strip line 2. As a current section 16 provides an electric current between the electrodes 1 with the strip line 2 being cooled to a temperature near or lower than a superconducting transition temperature: Tc, and a voltage section 17 determines a potential difference in the strip line 2, this change in the resistance value of the strip line 2 is picked up by a signal processing section 18. Alternatively, as the voltage section 17 applies a constant voltage between the electrodes 1 with the strip line 2 being cooled to the temperature near or lower than the superconducting transition temperature: Tc, and the current section 16 determines a current flowing in the strip line 2, the change in the resistance value of the strip line 2 is picked up by the signal processing section 18. Thus, the current section 16, the voltage section 17 and the signal processing section 18 function as "resistance determining means".

Figure 3:
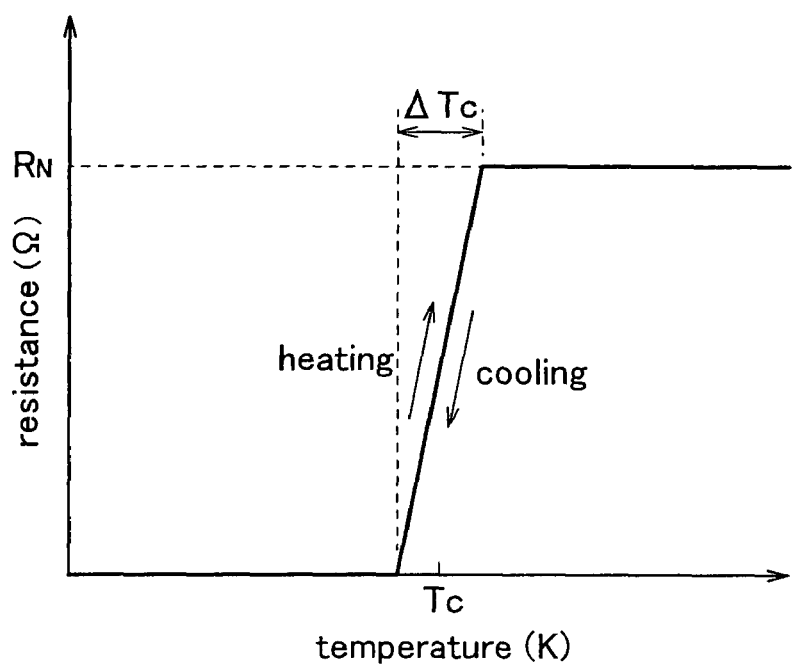
FIG. 3 is a view showing relationship between temperature and resistance value of strip line.

FIG. 3 illustrates a relationship between the temperature and the resistance value of $MgB_2$ prior to formation of the strip line 2.

The superconducting material constituting the strip line 2 exhibits a substantially zero electric resistance at a temperature lower than or equal to the superconducting transition temperature: Tc. When the material receives effect of thermal energy and its temperature rises by $\Delta$Tc to be higher than or equal to the superconducting transition temperature: Tc, there is developed an electric resistance: $R_N$ therein. And, when the superconducting material of the strip line 2 is cooled to be a temperature lower than or equal to the superconducting transition temperature: Tc, the electric resistance becomes substantially zero again. For instance, if heat is generated due to a nuclear reaction between $^{10}B$ in the strip line 2 and neutrons while the strip line 2 is cooled to a temperature lower than or equal to the superconducting transition temperature: Tc, there will develop an electric resistance until the temperature of the strip line 2 becomes lower than or equal to the superconducting transition temperature: Tc again. Namely, by detecting the resistance value of the strip line 2, it is possible to detect whether there has occurred a nuclear reaction between $^{10}B$ in the strip line 2 and neutrons or not. In other words, neutron detection can be made by determination of the resistance value of the strip line 2.

Further, as shown in FIG. 2, in this superconducting element 20, on the back side portion of the substrate 10 opposite to the one surface thereof having the strip line 2 formed thereon, there is provided a heat dissipation setting means 5 for adjusting the dissipation of heat resulting from the nuclear reaction. As can be seen from the relationship between the temperature and the resistance value of the strip line 2 shown in FIG. 3, when heat is generated due to a nuclear reaction in the strip line 2, this causes a rise in the temperature of the strip line 2, thus raising its resistance value. Then, when the heat due to the nuclear reaction is dissipated, there causes a drop in the temperature of the strip line 2, thus decreasing its resistance value. That is to say, if setting is made by the heat dissipation setting means 5 for enhancing the dissipation of the heat generated in the strip line 2, the heat of the nuclear reaction will be dissipated quickly, so that the temperature of the strip line 2 too will drop quickly. As a result, the time resolution of neutron detection is enhanced. Conversely, if setting is made by the heat dissipation setting means 5 for deteriorating the dissipation of the heat generated in the strip line 2, this will result in localized residence of the heat of nuclear reaction, thus tending to invite rise in the temperature of the strip line 2 for an extended period of time. As a result, the sensitivity of the neutron detection is improved.

Next, with reference to FIGS. 4 through 10, there will be described a process of manufacturing the superconducting element 20 illustrated in FIG. 1 and FIG. 2.

Figure 4:
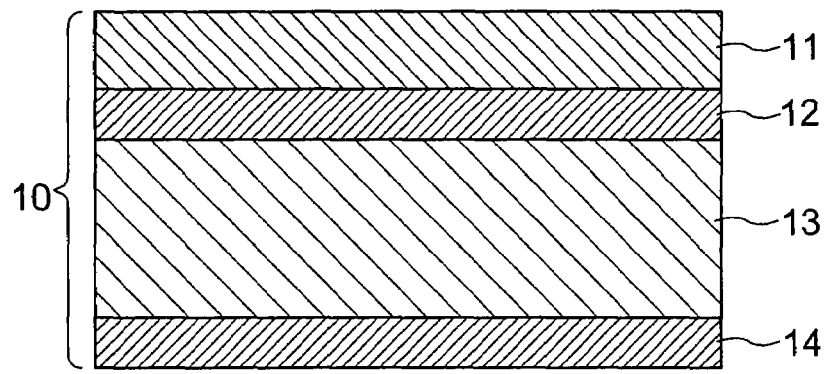
FIG. 4 is a view for explaining a manufacturing process of the superconducting element.

FIG. 4 shows a structure which is to constitute the substrate 10 of the superconducting element 20. In this substrate 10, opposed sides of an Si layer 13 (400 µm in thickness) are sandwiched between a pair of $SiO_2$ layers 12, 14 (300 nm in thickness) and on the top of this assembly, there is formed an SiN layer 11 (1 µm in thickness). Therefore, the laminated structure of the $SiO_2$ layer 12 and the SiN layer 11 functions as a "membrane layer" for allowing downward conduction of heat of the strip line 2 for its dissipation.

Figure 5:
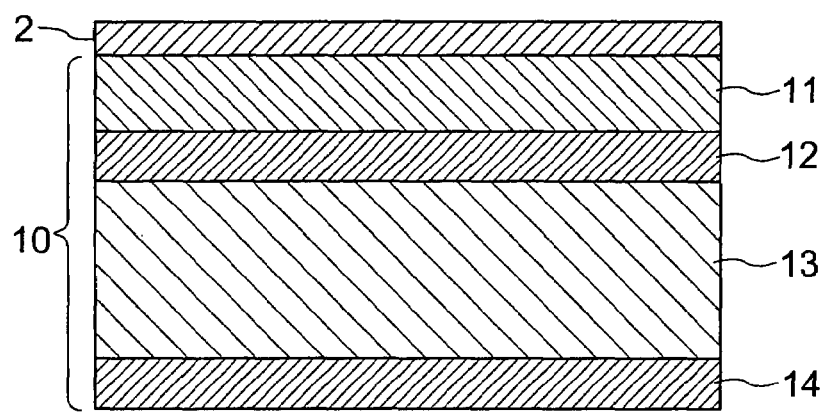
FIG. 5 is a view for explaining a manufacturing process of the superconducting element.
Figure 6:
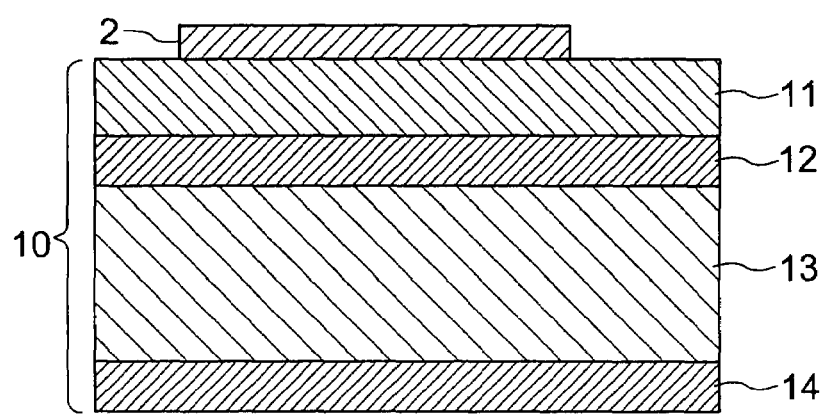
FIG. 6 is a view for explaining a manufacturing process of the superconducting element.
Figure 7:
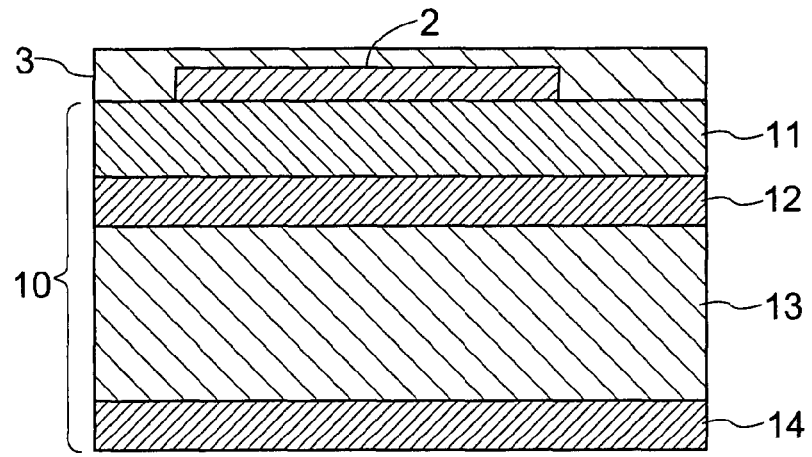
FIG. 7 is a view for explaining a manufacturing process of the superconducting element.
Figure 8:
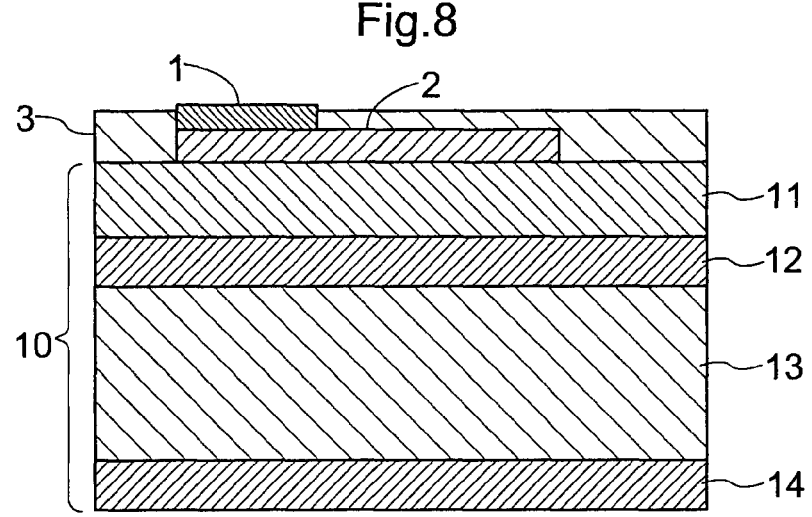
FIG. 8 is a view for explaining a manufacturing process of the superconducting element.

Next, as shown in FIG. 5, on the SiN layer 11, there is formed an $MgB_2$ layer (170 nm in thickness) as a superconducting material. This $MgB_2$ layer is formed by sputtering and contains $^{10}B$ as a major component thereof. And, a portion of this $MgB_2$ layer is to form the strip line 2. More particularly, as shown in FIG. 6, the $MgB_2$ layer will be etched into a meandering form as illustrated in FIG. 1. In this, a resist formed on the $MgB_2$ layer will be subjected to an electron drawing and an etching by an ECR plasma, whereby the meandering form having a line width and a line interval both being about 1 µm as shown in FIG. 1 will be obtained. Next, as shown in FIG. 7, there is formed a protective layer (SiO) 3 for protecting the $MgB_2$ layer. This protective layer 3 is formed in order to prevent deterioration in the superconducting performance of the superconducting material constituting the strip line 2 due to natural oxidation thereof in atmospheric air at a room temperature. Thereafter, in order to produce the electrodes 1 shown in FIG. 1, the protective layer 3 will be etched partially to expose the $MgB_2$ layer. Then, on the exposed $MgB_2$ layer portion, an electrode material is deposited, whereby a structure shown in FIG. 8 is obtained.

In the manner described above, in the superconducting element 20 constituting the neutron detecting element section 21, the front side portion structure of the substrate 10 which is the side for neutron detection is produced.

Figure 9:
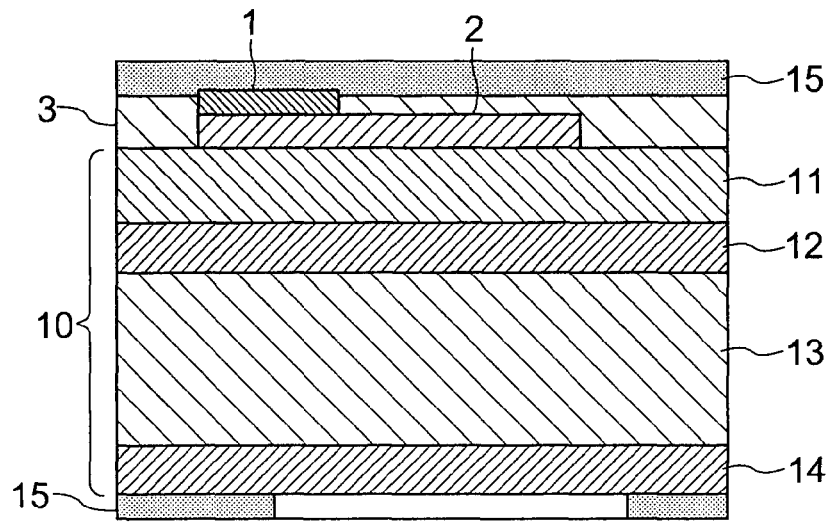
FIG. 9 is a view for explaining a manufacturing process of the superconducting element.

Next, with reference to FIG. 2, FIG. 9 and FIG. 10, there will be described the structure of the back side portion of the substrate 10. As described hereinbefore, in the back side portion of the substrate 10 opposite to the front side portion thereof formed with the strip line 2, there is provided the heat dissipation setting means 5 for setting dissipation characteristics for the heat due to the nuclear reaction between the superconducting element contained in the strip line 2 and neutrons. FIG. 9 shows a condition when a mask has been formed by removal of a portion of a resist layer 15 applied to the back side portion subsequent to application of the resist layers 15 to the front side portion and the back side portion of the structure shown in FIG. 8. In this, the reason why the resist layer 15 is applied also to the front side portion is to prevent damage to the protective layer 3, the electrodes 1 and the strip line 2 formed on the front side portion of the substrate 10 in the course of the subsequent etching step.

Figure 10:
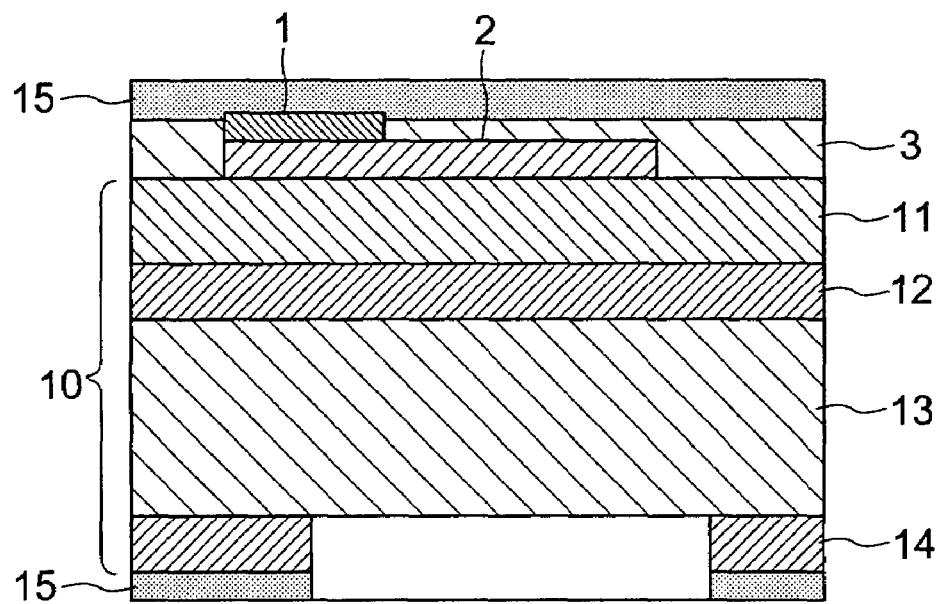
FIG. 10 is a view for explaining a manufacturing process of the superconducting element.

FIG. 10 shows a structure obtained when a portion of the $SiO_2$ layer 14 on the back side portion shown in FIG. 9 has been removed by the etching. This etching step can be realized as e.g. a dry etching technique such as the reactive ion etching (RIE) or a wet etching technique such as one using a BHF solution. Thereafter, as shown in FIG. 9, the Si layer 13 having an opened window will be removed by anisotropic wet etching technique using EDP (ethylenediamine pyrocatechol). As a result, on the back side portion of the substrate 10 shown in FIG. 2, there will be formed a recess by the removal of the Si layer 13. In this, the area of the etching removal of the Si layer 13 corresponds to the area of the strip line 2 formed in the meandering form on the front side portion of the substrate 10.

In the manner described above, the superconducting element 20 shown in FIGS. 1 and 2 for example can be formed.

Next, there will be described the characteristics of the neutron detecting element section 21 having the superconducting element 20 described above.

As shown in FIG. 1, between the electrodes 1, there are connected the current section 16 which can be used as a current source capable of supplying an electric current to the strip line 2 or an amperemeter capable of determining an electric current flowing therethrough and the voltage section 17 which can be used as a voltage source capable of applying a voltage to the strip line 2 or a voltmeter capable of determining a potential difference being developed. There is also provided a resistance determining means capable of deriving a resistance value of the strip line 2 from the current value and the potential difference obtained by the current section 16 and the voltage section 17. Therefore, the resistance determining means can be realized with using the current section 16, the voltage section 17 and the signal processing section 18.

In the inventive neutron detector to be detailed later, the thickness of the back side portion of the substrate 10 of the neutron detecting element section 21, that is, in the present embodiment, the thickness of the SiN layer 11, the $SiO_2$ layer 12 and the Si layer 13 set by etching the Si layer 13 (the thickness of this Si layer 13 can be zero if desired) can be variably set by adjusting the etching depth. And, by varying the thickness of the Si layer 13, the dissipation characteristics for the heat resulting from the nuclear reaction of the strip line 2 can be varied as desired. In the present embodiment, the variable setting of the thickness (t1 and t2 in FIG. 14) of the back side portion of the substrate 10 comprises the heat dissipation setting means 5. By increasing the thickness of the back side portion of the substrate 10, the heat dissipation characteristics can be enhanced or improved. Conversely, by decreasing the thickness of the back side portion of the substrate 10, the heat dissipation characteristics can be reduced or deteriorated. That is to say, when the thickness of the back side portion of the substrate 10 is increased, this results in increase in the amount of heat conducted by this back side portion away from the vicinity of the strip line. As a result, while, of the heat generated due to the nuclear reaction, the portion thereof staying adjacent the strip line is decreased, the residence time of the heat is reduced so that the heat dissipation characteristics can be improved. As a result, the time resolution for the nuclear reaction between the superconducting element in the strip line and neutrons can be enhanced. On the other hand, when the thickness of the back side portion of the substrate 10 is decreased, this results in decrease in the amount of heat conducted by this back side portion away from the vicinity of the strip line. As a result, while, of the heat generated due to the nuclear reaction, the residence time of the heat portion staying adjacent the strip line is increased, so that the heat dissipation characteristics is deteriorated, the amount of the heat staying there can be increased. As a result, the detection sensitivity for the nuclear reaction between the superconducting element in the strip line and neutrons can be enhanced.

Figure 11:
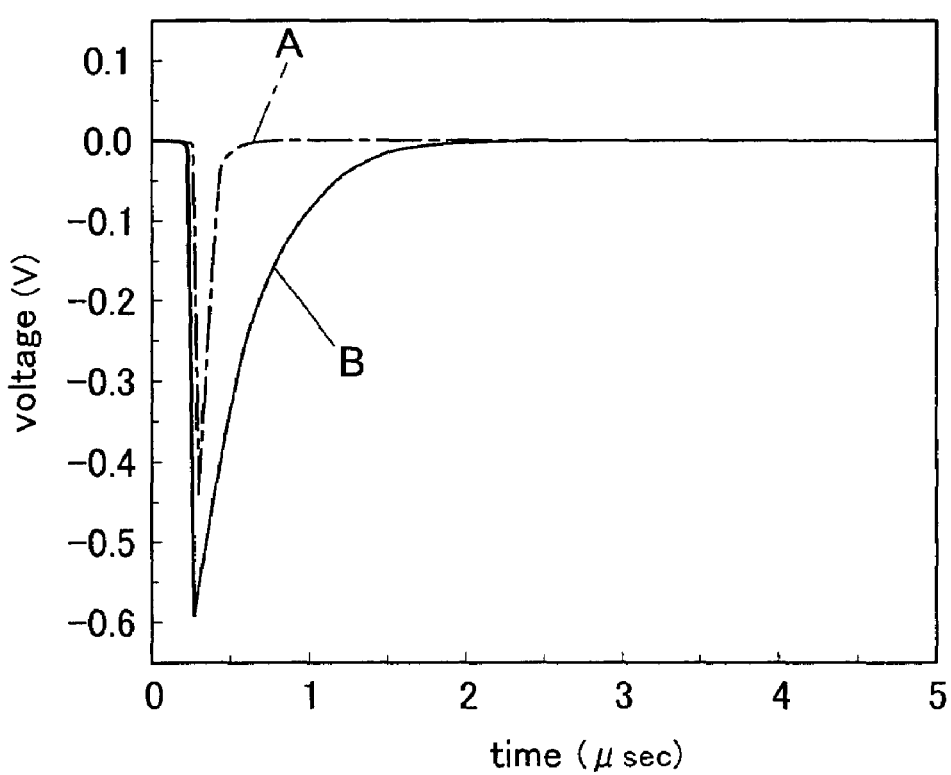
FIG. 11 is a graph for explaining an exemplary operation of the neutron detecting element section.

FIG. 11 shows a graph for explaining an exemplary operation of the neutron detecting element section 21. Specifically, this shows result of determination of voltage (potential difference) by the voltage section 17 while the current section 16 was supplying a constant electric current. Characteristics A is the result when the dissipation characteristics by the heat dissipation setting means 5 was improved, whereas Characteristics B is the result when the dissipation characteristics by the heat dissipation setting means 5 was deteriorated. More particularly, regarding the thickness of the back side portion of the substrate 10 corresponding to the portion denoted with t1 or t2 in FIG. 14, Characteristics A is the result when this thickness was set as 380 [μm] and Characteristics B is the result when this thickness was set as 100 [μm], respectively. As seen from FIG. 11, in Characteristics A, the absolute value of the voltage detected is small, the period of voltage detection is shorter. Hence, it may be said that the time resolution is improved. On the other hand, in Characteristics B, the period of voltage detection is extended, but the absolute value of the voltage detected is greater. Hence, it may be said that the detection sensitivity is improved.

Figure 12:
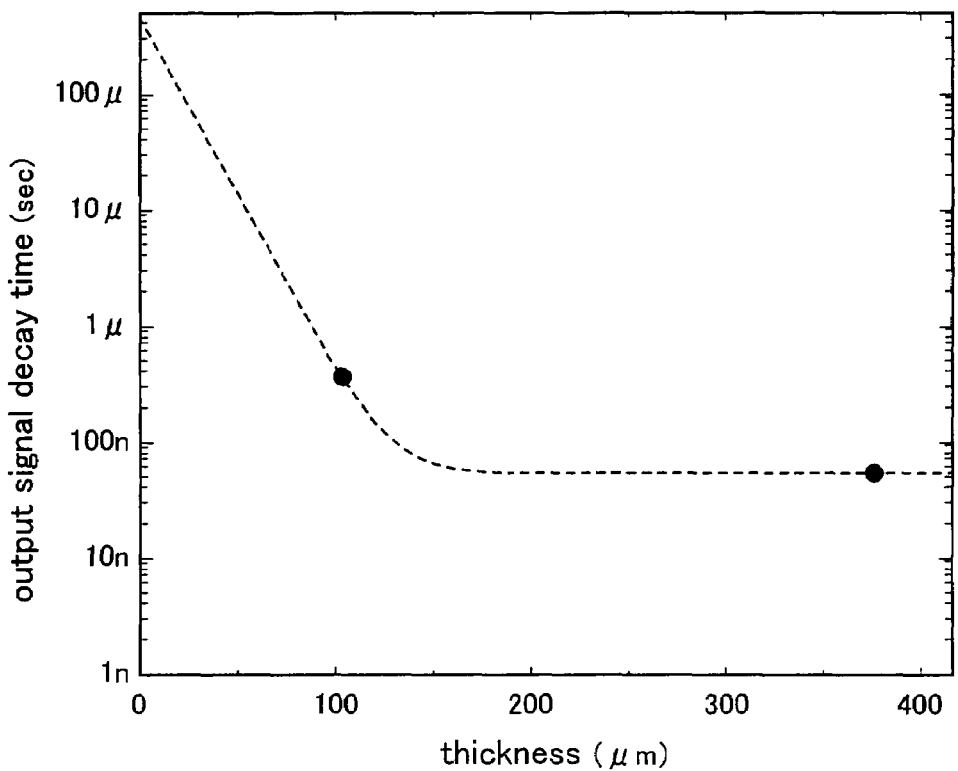
FIG. 12 is a graph showing relationship between thickness of back side portion of substrate and decay time of output signal.
Figure 13:
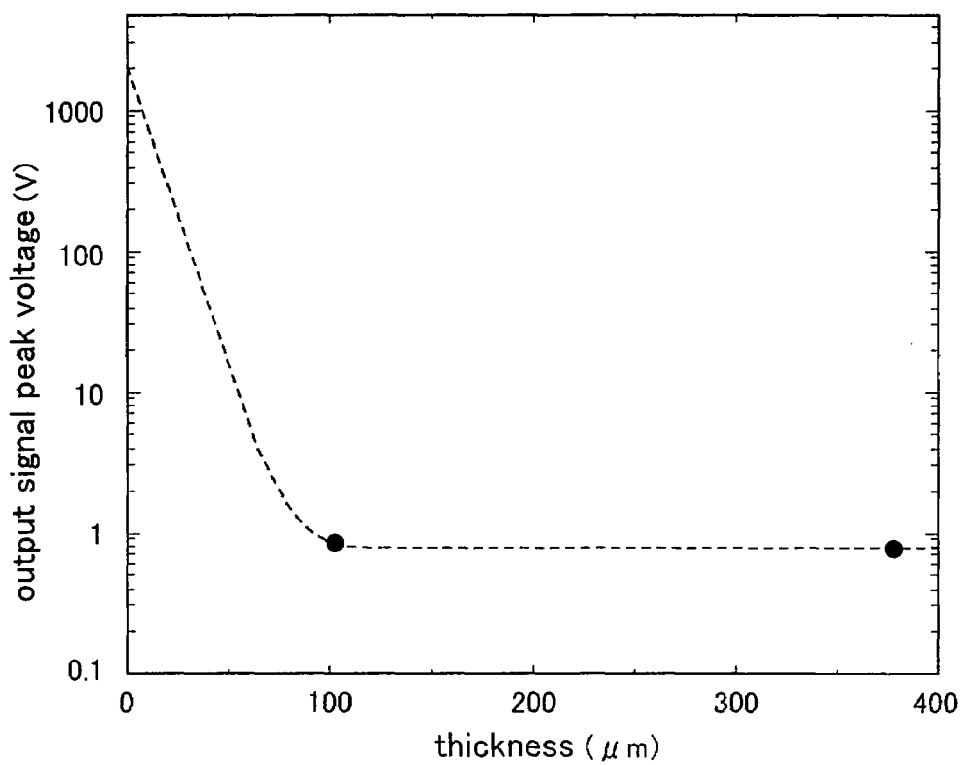
FIG. 13 is a graph showing relationship between thickness of back side portion of substrate and peak voltage of output signal.

FIG. 12 is a graph illustrating relationship between the thickness of the back side portion of the substrate 10 and the decay time of output signal. FIG. 13 is a graph illustrating relationship between the thickness of the back side portion of the substrate 10 and the peak voltage of the output signal. As shown in these graphs, the greater the thickness of the back side portion of the substrate 10, the shorter the decay time of the output signal, hence, the characteristics of superior time resolution is provided. On the other hand, the smaller the thickness of the back side portion of the substrate 10, the greater the peak voltage of the output signal, hence, the characteristics of superior detection sensitivity is provided. Incidentally, in these graphs, two black dots represent actually determined values, whereas the broken lines represent estimated values of these relationships.

Figure 14:
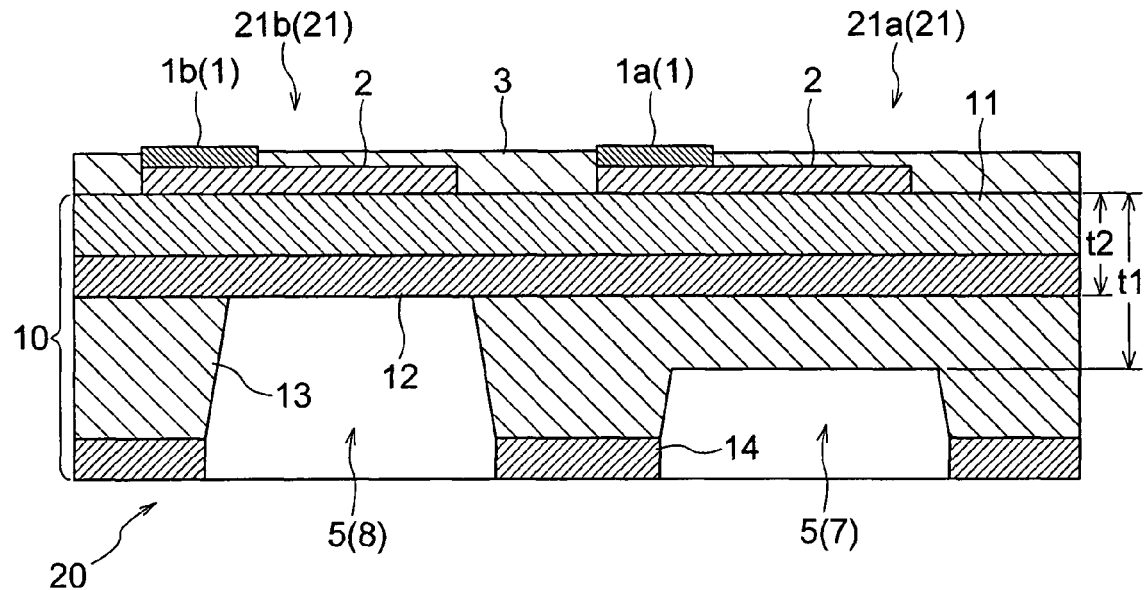
FIG. 14 is a vertical section of a neutron detector.

The neutron detector shown in FIG. 14 includes two neutron detecting element sections 21a, 21b identical to the one described above, disposed on a single substrate 10. And, between these neutron detecting element sections 21a, 21b, the thicknesses of the back side portions of the substrate 10 are differentiated from each other, thus providing different heat dissipation characteristics for the heat generated by the nuclear reaction in the strip line 2. More particularly, in FIG. 14, the thickness t1 of the back side portion of the substrate 10 of the right-side neutron detecting element section 21a is set greater than the thickness t2 of the back side portion of the substrate 10 of the left-side neutron detecting element section 21b (t1>t2). With this, the right-side neutron detecting element section 21a is constructed as a "resolution-priority type" neutron detecting element section 21 with enhanced time resolution by setting of the heat dissipation characteristics by the heat dissipation setting means 5 superior to that of the left-side neutron detecting element section 21b. That is, the heat dissipation setting means 5 of this right-side neutron detecting element section 21a functions as a time resolution setting section 7 for setting the time resolution through setting of the thickness t1 of the back side of the substrate 10. On the other hand, the thickness t2 of the back side portion of the substrate 10 of the left-side neutron detecting element section 21b is set smaller than the thickness t1 of the back side portion of the substrate 10 of the right-side neutron detecting element section 21a. With this, the left-side neutron detecting element section 21b is constructed as a "sensitivity-priority type" neutron detecting element section 21 with enhanced sensitivity by setting of the heat dissipation characteristics by the heat dissipation setting means 5 inferior to that of the right-side neutron detecting element section 21a. That is, the heat dissipation setting means 5 of this left-side neutron detecting element section 21b functions as a sensitivity setting section 8 for setting the detection sensitivity through setting of the thickness t2 of the back side of the substrate 10. Except for the thicknesses t1, t2 of the back side portions of the substrate 10, these two neutron detecting element sections 21a, 21b are identical in the construction to each other.

Provided with the construction shown in FIG. 14, this neutron detector can effect both a mode of neutron detection with superior time resolution by the resolution-priority type neutron detecting element section 21a and a further mode of neutron detection with superior detection sensitivity by the sensitivity-priority type neutron detecting element section 21b.

Figure 15:
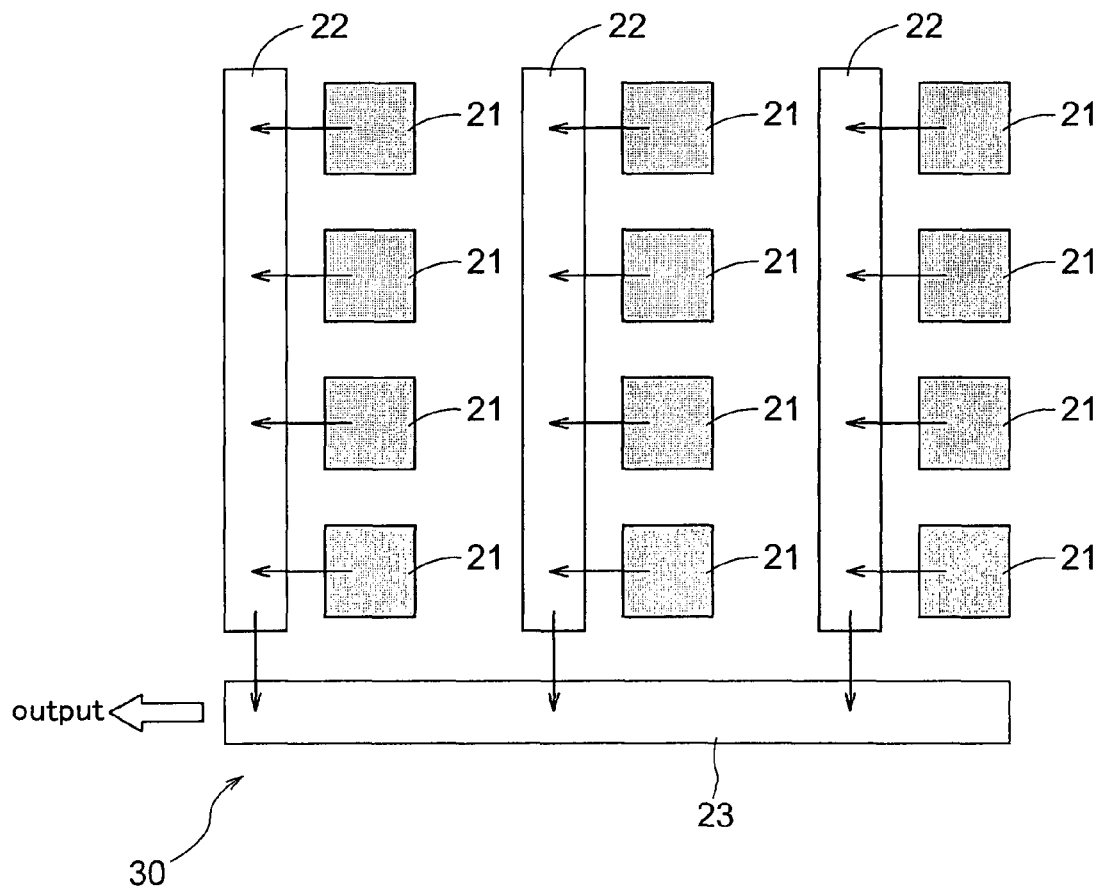
FIG. 15 is a schematic of a neutron imaging sensor.

FIG. 15 shows a schematic of a neutron imaging sensor 30 including a plurality of the above-described neutron detecting element sections 21 arranged two-dimensionally in arrays. This neutron imaging sensor 30 includes the plurality of neutron detecting element sections 21 each adapted for outputting a current signal or a voltage signal generated in association with a change in resistance due to variation of the heat dissipation characteristics for the heat generated as the result of nuclear reaction in the strip line 2, vertical transmission CCD 22 and horizontal transmission CCD 23 for transmitting these signals. As shown in FIG. 14, the heat dissipation characteristics are differentiated from each other among the plurality of neutron detecting element sections 21. The construction of each neutron detecting element section 21 is identical to that shown in FIG. 1. Therefore, the current section 16, the voltage section 17 and the signal processing section 18 are provided in each one of the plurality of neutron detecting element sections 21 for determining a resistance value thereof. And, the signal processing section 18 detects the current signal or the voltage signal with using a noise filter, an amplifier, etc. Upon detection of the current signal or voltage signal, the signal processing section 18 outputs a constant current for a predetermined period, regardless of the intensity of this signal. With this, electric charge will be accumulated in the vertical transmission CCD 22. Alternatively, the signal processing section 18 detects the current signal or voltage signal via a noise filter and then amplifies this signal to a predetermined signal intensity, regardless of its present intensity and outputs a predetermined current for a predetermined period. With this, electric charge will be accumulated in the vertical transmission CCD 22. In either case, the charge accumulated in the vertical transmission CCD 22 will be transmitted to the horizontal transmission CCD 23 and outputted eventually as data representing a two-dimensional image. As a result, two-dimensional neutron detection is made possible. Incidentally, it is preferred that the plurality of neutron detecting element sections 21, the vertical transmission CCD 22 and the horizontal transmission CCD 23 constituting this neutron imaging sensor 30 be disposed on a same substrate 10.

Figure 16:
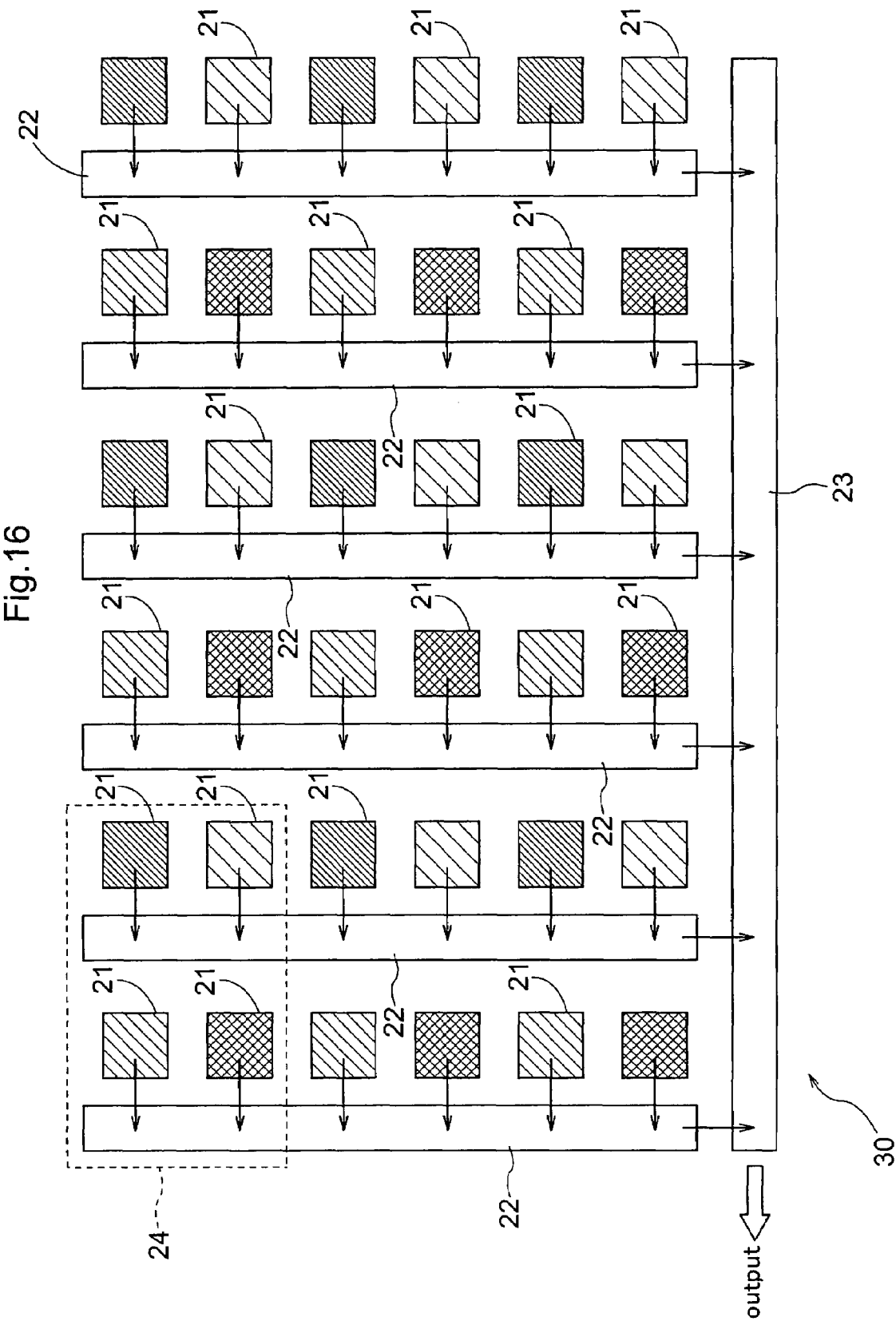
FIG. 16 is a view explaining arrangement of neutron detecting element sections in the neutron imaging sensor.

FIG. 16 shows a schematic of a further construction of a neutron imaging sensor 30 including a plurality of the neutron detecting element sections 21 arranged two-dimensionally in arrays, wherein the heat dissipation characteristics are differentiated from each other in four levels among the neutron detecting element sections 21. In this figure, the neutron detecting element sections 30 denoted with different hatching patterns have different heat dissipation characteristics from each other. Therefore, this neutron imaging sensor 30 is capable of detecting neutrons in four different levels of time resolution and detection sensitivity. In this example, four neutron detecting element sections 21 having different heat dissipation characteristics from each other and arranged in two rows and two columns are grouped as one set of detecting unit 24. And, a plurality of such detecting units 24 are arranged two-dimensionally to constitute the neutron imaging sensor 30. Incidentally, when the neutron detecting element sections 21 are to be constructed to have heat dissipation characteristics different in a plurality of levels, there can be two or three levels or five or more levels. In these cases, regarding the arrangement (layout) of the neutron detecting element sections 21 of the respective levels, it is preferred to avoid localized arrangement of the neutron detecting element sections 21 of a same level of heat dissipation characteristics.

<1>

In the foregoing embodiment, the material, shape, size of the superconducting element, the arrangement of the electrodes 1 shown in the figures can be modified. For instance, in the foregoing embodiment, the strip line 2 contains $MgB_2$ as a superconducting material. Instead, the strip line in the meandering form can be formed by depositing a compound layer containing $^{10}B$ on or beneath a superconducting material such as Nb, NbN or the like. Further, in the foregoing embodiment, the strip line 2 contains $MgB_2$ as the superconducting material, so that there occurs a nuclear reaction between $^{10}B$ therein and neutrons. The combination for providing the reaction is not limited thereto, but can be a different one.

Moreover, the thicknesses of the respective layers together constituting the substrate 10 disposed under the strip line 2 and the number of the layers, etc. can vary as desired. Further, in the foregoing embodiment, the strip line 2 has the meandering form as shown in FIG. 1. The from of the strip line can be modified, such as a straight line or any other form.

<2>

In the foregoing embodiment, as shown in FIG. 2 and FIG. 14, the heat dissipation setting means is realized by various setting of the depth of the recess formed by etching of the Si layer 13. The heat dissipation setting means can be realized by any other construction. For instance, the heat dissipation characteristics for the heat generated due to the nuclear reaction in the strip line 2 can be set or adjusted by depositing a material of good or poor heat conductivity in the recess formed by etching.

<3>

In the foregoing embodiment, the membrane layer for allowing downward conduction of the heat of the strip line 2 for its dissipation is comprised of the laminated assembly of the $SiO_2$ layer 12 and the SiN layer 11. However, the construction of the membrane layer is not limited thereto. For example, a single-layer type membrane layer can be formed by forming an $SiO_2$ layer 12 or an SiN layer 11 on the Si layer 13 and then forming the strip line 2 thereon. Or, the membrane layer can have a multi-layered structure consisting of three or more layers.

Further, the materials for forming the membrane layer can be other materials than $SiO_2$ and SiN described above.

The neutron detector and the neutron imaging sensor according to the present invention can be used for e.g. detection of neutron inside a nuclear reactor, structural analysis of a substance utilizing neutron diffraction.

The invention claimed is:

1. A neutron detector comprising:
    a plurality of neutron detecting element sections, each said neutron detecting element section having;
    a superconducting element including a substrate having at least one of surfaces thereof formed of a dielectric material, a strip line of the superconducting material formed on said surface and electrodes formed at opposed ends of said strip line,
    resistance determining sections adapted for determining generation of heat resulting from a nuclear reaction between a superconducting element in the strip line and neutrons, through detection of change in a resistance value of said strip line,
    a heat dissipation setting section provided on a back side portion of said substrate opposite to said surface having said strip line formed thereon, said heat dissipation setting section adapted for setting dissipation characteristics of said heat resulting from the nuclear reaction, and
    the heat dissipation characteristics being differentiated from each other between/among the neutron detecting element sections.

2. The neutron detector according to claim 1, wherein said plurality of neutron detecting element sections are provided on a same single substrate.

3. The neutron detector according to claim 1, wherein the detector includes three or more of said neutron detecting element sections, with the heat dissipation characteristics being differentiated among them in three or more levels.

4. The neutron detector according to claim 1, wherein variable setting of thickness of the back side portion of said substrate constitutes said heat dissipation setting section.

5. The neutron detector according to claim 1, wherein the thicknesses of the back side portions of said substrate are differentiated from each other between/among the neutron detecting element sections.

6. The neutron detector according to claim 1, wherein said resistance determining sections are configured to determine the resistance value of each individual one of the plurality of neutron detecting element sections.

7. The neutron detector according to claim 1, wherein some of the plurality of neutron detecting element sections are resolution priority type neutron detecting element sections having enhanced time resolution obtained by improving the heat dissipation characteristics by the heat dissipation setting section, relative to those of the other neutron detecting element sections.

8. The neutron detector according to claim 1, wherein some of the plurality of neutron detecting element sections are sensitivity priority type neutron detecting element sections having enhanced sensitivity by degrading the heat dissipation characteristics by the heat dissipation setting section, relative to those of the other neutron detecting element sections.

9. The neutron detector according to claim 1, wherein said superconducting material contains $MgB_2$, so that $^{10}B$ present in said strip line provides the nuclear reaction with the neutrons.

10. The neutron detector according to claim 1, wherein said strip line is formed as a meandering strip line.

11. A neutron imaging sensor comprising a plurality of said neutron detecting element sections according to claim 1 arranged in the form of an array.

* * * * *